Oct. 4, 1955     R. R. DILLON     2,719,430
PROVING RING TYPE DYNAMOMETER
Filed Dec. 13, 1952     2 Sheets-Sheet 1
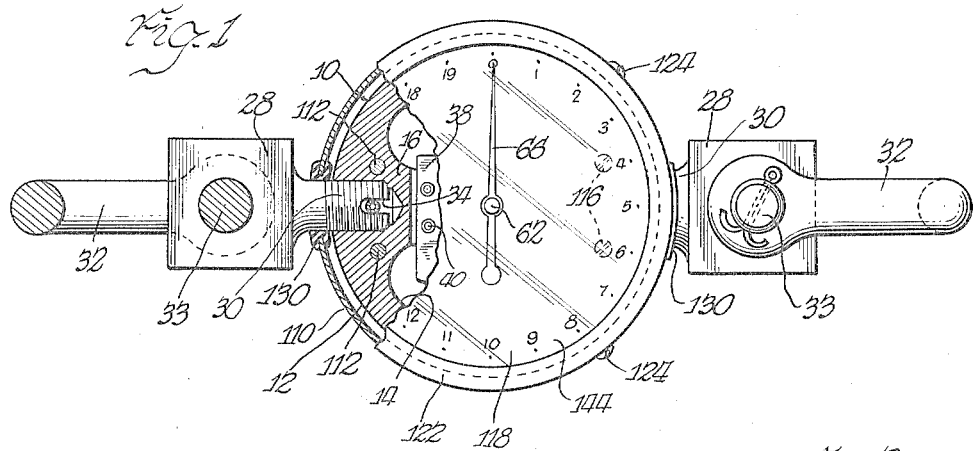

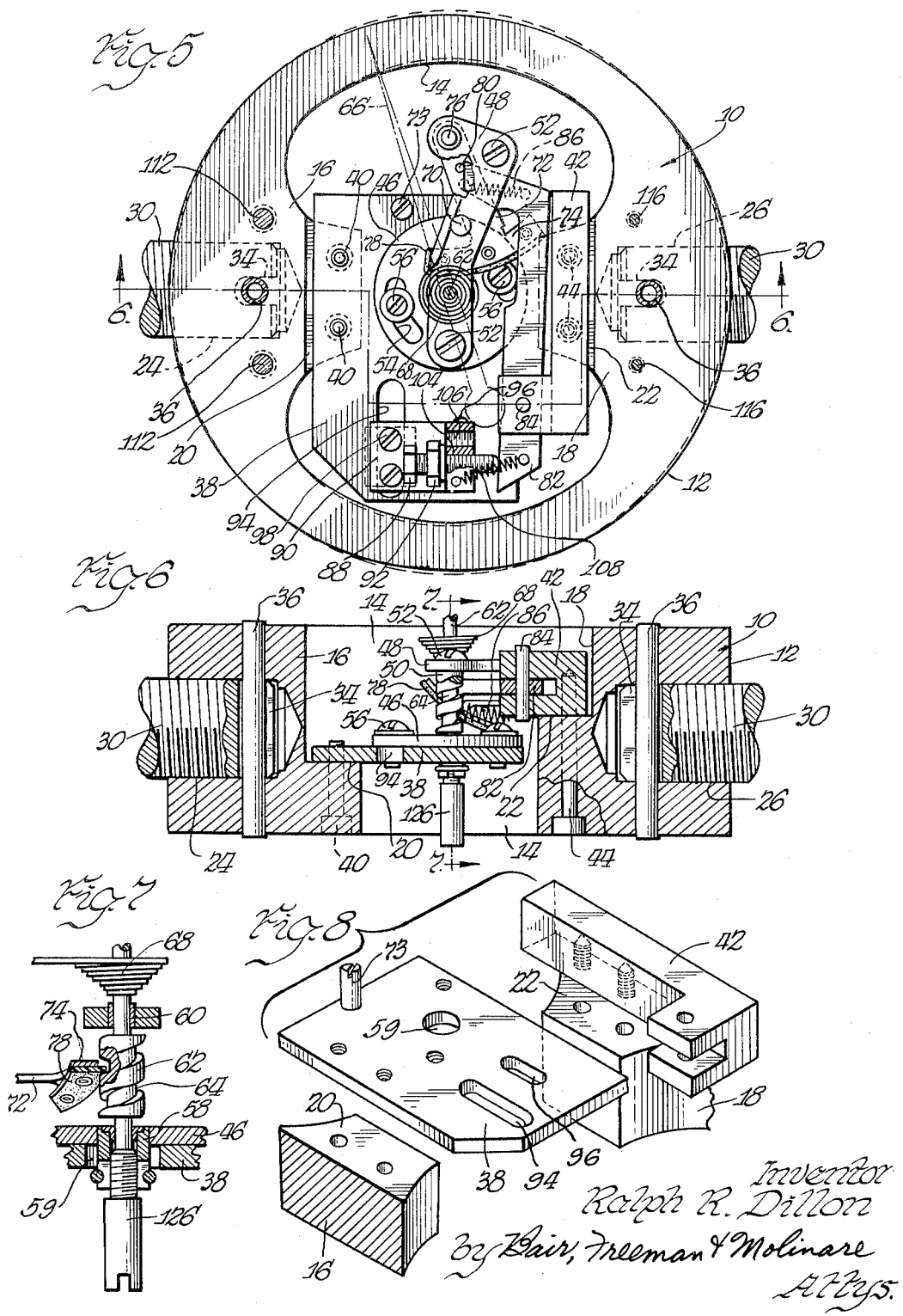

United States Patent Office 2,719,430
Patented Oct. 4, 1955

2,719,430

PROVING RING TYPE DYNAMOMETER

Ralph R. Dillon, Van Nuys, Calif., assignor to W. C. Dillon & Company, Inc., Van Nuys, Calif., a corporation of Illinois Application December 13, 1952, Serial No. 325,835

4 Claims. (Cl. 73—141)

This invention relates to a dynamometer of the type generally utilized in measuring exerted forces.

One object of the present invention is to provide a dynamometer of the proving ring type whereby linearity of calibration may be had and a compact dynamometer of relatively great strength and ruggedness is provided. At the same time accuracy is not sacrificed and it is held continuously even during heavy-duty operation of the dynamometer.

Another object is to provide a proving ring type of dynamometer which can be made economically, the proving ring being so shaped and formed that it may be cut from round bar stock such as steel without any exterior wastage of material as when bosses are formed exteriorly of the ring, my ring on the other hand having the bosses formed interiorly and of substantially rectangular cross section and being provided with rabbets which form mounting shoulders for a gauge movement together with the necessary parts to cooperate therewith for operating the gauge movement as a result of movement of the bosses toward or away from each other when forces to be measured by the dynamometer are exerted thereon.

Still another object is to provide a dynamometer in which there is in-line loading due to the ring design, which eliminates torque strains in the deformable element of the dynamometer and in which the action is such that the gauge movement and a pivot carrying element also move in a straight line (along the axis of loading), and the co-operating parts thereof thereby coact so as to give a linear movement to the gauge in exact proportion to the load or force applied to the proving ring.

A further object is to provide a rugged structure for measuring the movement of the bosses of the proving ring toward and away from each other, which is capable of withstanding much abuse including a fluctuating load without resulting in inacuracy of reading or appreciable wear of the parts.

Still a further object is to provide a preferable type of gauge movement used in the dynamometer which uses a helical groove and a blade coacting therewith in place of the conventional gear sector and pinion, and which therefore will operate accurately even when foiled with grit or dust and at the same time give a very much longer life than the conventional type, the helical groove being considerably wider than the blade that enters it in order to allow shock freedom when sudden impact loading is introduced, and if of fluttering nature, the blade may flutter in the groove with the inertia of the pointer and its shaft preventing coincident flutter of the indicating needle.

An additional object is to provide an arrangement that makes possible adjustment at the factory to correlate the capacity of the dynamometer with the scale applied thereto and the construction is such that factory zero adjustment is had and also a field zero adjustment.

With these and other objects in view, my invention consists in the construction, arrangement and combination of the various parts of my proving ring type dynamometer, whereby the objects contemplated are attained, as hereinafter more fully set forth, pointed out in my claims and illustrated in the accompanying drawings, wherein:

Figure 1 is a front elevation of a proving ring type of dynamometer embodying my present invention.

Figure 2 is a front elevation on an enlarged scale of the operating mechanism of the dynamometer, the housing being removed and the connector elements shown only partially, and the dynamometer being unloaded.

Figure 3 is a vertical sectional view on the line 3—3 of Figure 2 with the housing shown in position.

Figure 4 is a detail sectional view on the line 4—4 of Figure 2.

Figure 5 is a view similar to Figure 2 except showing the parts in loaded position.

Figure 6 is a sectional view on the line 6—6 of Figure 5 to show the relation of parts.

Figure 7 is an enlarged sectional view on the line 7—7 of Figure 6; and

Figure 8 is a perspective view of a gauge movement base and a pivot carrying element together with the bosses of the proving ring and the shoulders thereof on which the gauge movement base and the pivot carrying element are mounted.

On the accompanying drawings I have used the reference numeral 10 to indicate in general a proving ring. It has a cylindrical outer surface 12 and a cylindrical inner surface 14, the inner surface, however, being interrupted by diametrically opposite bosses 16 and 18.

A force measuring element of the kind disclosed is economical to manufacture in that it may be made of round bar stock, the bar being cut into sections and the inside machined out by means of a milling cutter or the like. The finished product is suitably reinforced by the internal bosses 16 and 18 and they may be provided with tapped sockets 24 and 26 to receive the shanks 30 of connector elements 28, the shanks, of course, being threaded to enter the tapped sockets.

Compression or tension forces may be applied to the connector elements 28 as desired. For tension forces, clevis elements 32 are provided which are pivoted to the connector elements by clevis pins 33. To retain the connector elements 28 against rotation after they are screwed into the sockets 24 and 26, the shanks 30 may be cross slotted as indicated at 34 and locking pins provided to extend through these slots and through the bosses 16 and 18.

The boss 16 is rabbeted to provide a mounting shoulder 20 and the boss 18 is rabbeted to provide a mounting shoulder 22. A gauge movement base 38 is secured to the shoulder 20 by means of screws 40 and a pivot carrying element 42 is secured to the shoulder 22 by screws 44.

A gauge movement is mounted on the gauge movement base 38 and comprises a mounting plate 46 and a frame plate 48 connected together by means of posts 50 and screws 52. The mounting plate 46 is secured to the gauge movement base 38 by means of screws 56 passing through arcuate slots of the mounting plate and tapped into the base.

The gauge movement further includes bearings 58 and 60 in the mounting plate 46 and the frame plate 48 respectively for an indicator needle shaft 62. This shaft is enlarged at its center and the enlargement is provided with a helical groove 64 as best shown in Figure 7. An indicator needle 66 is mounted on the shaft as shown in Figures 1 and 3 to cooperate with a dial to be described later. A spiral spring 68 has one end secured to the indicator needle shaft 62 and its other end secured to a post 70 of the frame plate 48 and tends to rotate the indicator needle 66 counterclockwise in Figure 1 to zero position.

The gauge movement further includes a secondary lever 72 having a T-head 74 and a pivot shaft 76 which is pivoted in the mounting and frame plates 46 and 48. A stop post 73 is provided for the lever 72. The needle 66 is positioned on its shaft 62 so that it zeros when the secondary lever 72 is slightly spaced from the post 73 with no load on the dynamometer. A blade 78 preferably of fiber is riveted to the T-head 74 and its edge enters the helical slot 64 of the indicator needle shaft 62 as shown particularly in Figure 7. A pin 80 is carried by the secondary lever 72 for operating the lever as will hereinafter appear. A primary lever 82 is provided with a pivot pin 84 supported by the pivot carrying element 42. The normal relation of the parts is shown in Figure 2 with the upper end of the primary lever 82 held against the pin 80 by a spring 86.

An abutment screw 88 is provided carried by the gauge movement base 38. It is threaded in a tapped opening 104 of a bracket 90 and is thereby adjustable relative to the bracket, a lock nut 92 being provided to retain the adjustment. The base 38 is slotted at 94 and 96 to receive two screws 98 and a single screw 102 respectively. The screws 98 first pass through a clamp plate 100.

The adjustments of the bracket 90 relative to the base 38 and of the screw 88 relative to the bracket 90 are for capacity and factory zero adjustments respectively as will hereinafter appear. Also the bracket 90 has a second tapped hole 106 for a purpose which will be described. A spring 108 serves to normally retain the lower end of the primary lever 82 in engagement with the abutment screw 88.

I provide a housing 110 for my dynamometer secured to the boss 16 by means of a pair of screws 112. A dial 114 is secured to the boss 18 as by screws 116. This dial is suitably graduated as illustrated in Figure 1 and the indicator needle 66 cooperates with the graduations thereof to provide a direct reading of the distortion of the proving ring 10 translated into pounds or the like representing the forces applied to the connector elements 28. For example, a dynamometer which is made on a scale shown full size in Figures 2 and 3 is suitable for forces up to one ton so that each numbered graduation on the dial in Figure 1 would represent 100 lbs.

A dial cover 118 is provided which may be of glass, transparent plastic or the like, and a dial cover retainer holds it in position with a gasket at 120 for the purpose of sealing against entry of foreign matter into the housing 110. Screws 124 may be provided in the annular flange of the retainer 122 as shown in Figure 1 for holding the retainer on the housing 110.

A second zero adjustment is provided in the form of a screw 126 (see Figure 7) which is threaded into the bearing 58. Upon rotation it moves the indicator shaft 62 axially and thereby changes the angular position of the indicator needle 66 because the helical groove 64 engages one corner of the blade 78 as shown in section in this figure, such engagement being normally maintained by the spiral spring 68. To seal the adjustment screw 126 against the entry of foreign matter into the housing 110, a resilient grommet 128 may surround it as shown in Figure 3 and similar but larger grommets 130 may be used to seal the connector element shanks 30 relative to the housing 110 as shown at left side in Figure 1.

*Practical operation*

The initial position of the parts is as shown in Figure 2, the abutment screw 88 being adjusted so that the secondary lever 72 just clears the stop post 73, the needle at that time being on zero as indicated by dot-and-dash lines. It is now obvious, considering the gauge movement base 38 being stationary, that any movement toward the right of the pivot pin 84 will result in clockwise rotation of the primary lever 82 as to the position of Figure 5. This results in counter-clockwise movement of the secondary lever 72 so that the blade 78 travels in the helical groove 64, the springs 108, 86 and 68 causing follow-up movement of all the parts and assuring retention of engagement between 88 and 82, 82 and 80, and 78 and 64. Thus for each increment of movement of the pivot pin 84, a corresponding increment of movement of the needle 66 will occur whether the pin is moving toward the right or the left.

Figure 2 illustrates by solid lines the proving ring 10 with the outer surface 12 a true circle as the ring is originally formed. Any tension forces exerted on the clevises 32 will distort the ring to a somewhat elliptical shape as shown by dotted lines which is the same as the full line shape of Figure 5 wherein the original true circle shape is shown by dotted lines. Since the gauge movement and the abutment 88 are carried by the boss 16, and the pivot carrying element 42 and the primary lever 82 are carried by the boss 18, it is obvious that any movement apart of these two will move the pivot pin 84 as above described. The movement is lineal in the direction of the axis of the connector element shanks 30 because the proving ring is symmetrical. I have found that the graduations on the dial 114, if made in equal divisions, are accurate within satisfactorily close limits. Therefore, it is not necessary to individually calibrate dynamometers of the type disclosed.

Also reasonable variations in manufacture of the proving rings themselves may be tolerated and can be corrected by correlating the capacity of the particular proving ring being tested with the dial thereon. This is accomplished by movement of the bracket 90 in relation to the slots 94 and 96 which in effect changes the leverage of 42 from 88 to 84 with respect to its leverage from 84 to 80. Thus an adjustment for capacity is readily had and by providing a second tapped hole 106, the capacity can be increased (for instance to one-half) and a suitably graduated dial substituted for the one shown in Figure 1. This arrangement, I find more economical as it permits the use of a proving ring of a certain size for two different capacities that vary by 100% as compared with providing proving rings of two different dimensions for the two different sizes. Also, of course, capacity can be changed to a further degree by changing the width and/or thickness of the proving ring cross-section so that a dynamometer of the kind disclosed is capable of relatively great change of range in manufacture without changing the size of the housing therefor.

The conventional type of gauge movement may be used instead of the one disclosed wherein an arcuate gear meshes with a pinion, but it is preferable to provide the helical groove and blade type to prevent the possibility of inaccurate operation because of the teeth of the arcuate gear sector and pinion becoming worn or fouled with grit or dust. I find that the helical groove type of movement is not detrimentally affected by such fouling and has a much longer life. Also the wide spacing of the groove 64 with relation to the thickness of the blade 78 as shown in Figure 7 provides shock freedom for the indicating needle when sudden impact loading is introduced. If the load imposed is of a fluttering nature, the blade 78 can flutter while the inertia of the indicator needle 66 and its shaft 62 causes them to remain substantially still. The wiping action of the blade allows the type of construction disclosed to operate properly even in the presence of salt vapor, and foreign particles do not interfere with its operation as in the gear sector and pinion type of movement.

The adjustment of the abutment screw 88 relative to the bracket 90 provides a zero adjustment for the factory which may be locked by the lock nut 92 and the dynamometer then sealed within the housing 110. Thereafter a field adjustment for zeroing the needle is had by rotation of the screw 126.

While I have illustrated the dynamometer for tension forces, it may also be adapted for compression forces in which case the abutment screw 88 is adjusted to the left in Figure 2 until the levers 82 and 72 are in approximately the position shown in Figure 5 while the ring 10 is free of load. The needle 66 is replaced on zero. Thereafter any compression forces applied to the connector elements 28 will tend to collapse the proving ring 10 rather than stretch it and the needle 66 will be rotated counterclockwise from the zero position by the primary and secondary levers 82 and 72 against the tendency of the spiral spring 68 to retain the needle at the zero position. A different dial 114, of course, is provided in that event and the dynamometer disclosed may therefore be made up at the factory either as a compression type or a tension type as desired.

Some changes may be made in the construction and arrangement of the parts of my proving ring type dynamometer without departing from the real spirit and purpose of my invention, and it is my intention to cover by my claims any modified forms of structure or use of mechanical equivalents which may be reasonably included within their scope.

I claim as my invention:

1. In a dynamometer, a force measuring ring of substantially rectangular cross section having two diametrically opposite bosses, said bosses extending inwardly a substantially greater distance than the annular width of said ring and having oppositely tapped sockets aligned therewith and extending therein, connector elements secured in said sockets, a gauge movement base mounted on one of said bosses, a pivot carrying element mounted on the other of said bosses, a gauge movement and an abutment carried by said gauge movement base, and a lever pivotally carried by said pivot carrying element and operatively connected to said abutment and said gauge movement to translate movement of said bosses toward and away from each other into indicating movement of said gauge movement.

2. In a proving ring type dynamometer, a proving ring having a circular outer surface, and a circular inner surface interrupted by opposite inwardly extending bosses, said proving ring having oppositely tapped sockets aligned with and extending into said bosses, connector elements having screw threaded shanks extending into said sockets, said bosses being rabbeted to provide a pair of mounting shoulders, a gauge movement base mounted on one of said mounting shoulders, a pivot carrying element mounted on the other of said mounting shoulders, a gauge movement and an abutment carried by said gauge movement base, and a lever pivotally carried by said pivot carrying element and operatively connected to said abutment and said gauge movement to translate movement of said bosses toward and away from each other into indicating movement of said gauge movement.

3. In a dynamometer of the character disclosed, a force measuring ring having a circular outer surface, and a circular inner surface interrupted by two diametrically opposite bosses, said bosses extending inwardly a substantially greater distance than the annular width of said ring and having oppositely tapped sockets aligned therewith and extending therein, connector elements secured in said sockets, a gauge movement base mounted on one of said bosses, a pivot carrying element mounted on the other of said bosses, a gauge movement and an abutment carried by said gauge movement base, and a lever pivotally carried by said pivot carrying element and operatively connected to said abutment and said gauge movement to translate movement of said bosses toward and away from each other into indicating movement of said gauge movement.

4. In a proving ring type dynamometer, a proving ring having two diametrically opposite inwardly extending bosses, said proving ring having oppositely tapped sockets aligned with and extending into said bosses, connector elements having screw threaded shanks extending into said sockets, said shanks having cross slots, lock pins through said bosses and cross slots to prevent rotation of said connector elements relative to said proving ring, said bosses being rabbeted to provide a pair of mounting shoulders, a gauge movement base mounted on one of said mounting shoulders, a pivot carrying element mounted on the other of said mounting shoulders, a gauge movement and an abutment carried by said gauge movement base, a lever pivotally carried by said pivot carrying element and operatively connected to said abutment and said gauge movement to translate movement of said bosses toward and away from each other into indicating movement of said gauge movement.

References Cited in the file of this patent

UNITED STATES PATENTS

| Number | Name | Date |
| --- | --- | --- |
| 1,724,993 | Coker | Aug. 20, 1929 |
| 2,244,350 | Sugden et al. | June 3, 1941 |
| 2,287,299 | Dillon | June 23, 1942 |
| 2,294,869 | Buechmann | Sept. 1, 1942 |
| 2,355,688 | Weingart | Aug. 15, 1944 |